US010546319B1

(12) United States Patent
Deng et al.

(10) Patent No.: US 10,546,319 B1
(45) Date of Patent: Jan. 28, 2020

(54) METHOD AND SYSTEM FOR SELECTING ADVERTISEMENTS TO MINIMIZE AD FATIGUE

(71) Applicants: Houtao Deng, Sunnyvale, CA (US); John A. Bocharov, San Francisco, CA (US); S. Satishkumar, San Jose, CA (US); Sean Arnold Pudney, San Mateo, CA (US); Jaspreet Singh, Sunnyvale, CA (US)

(72) Inventors: Houtao Deng, Sunnyvale, CA (US); John A. Bocharov, San Francisco, CA (US); S. Satishkumar, San Jose, CA (US); Sean Arnold Pudney, San Mateo, CA (US); Jaspreet Singh, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1461 days.

(21) Appl. No.: 13/907,757

(22) Filed: May 31, 2013

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0264* (2013.01)

(58) Field of Classification Search
CPC .............. G06Q 30/0255; G06Q 30/0264
See application file for complete search history.

(56) References Cited

U.S. PATENT DOCUMENTS

| | | | | |
|---|---|---|---|---|
| 2005/0159921 A1* | 7/2005 | Louviere | ............... | G06Q 30/02 702/181 |
| 2009/0048905 A1* | 2/2009 | Feng | ................... | G06Q 30/00 705/14.43 |
| 2009/0192984 A1* | 7/2009 | Abrams | ................ | G06Q 30/02 |
| 2009/0327075 A1* | 12/2009 | Saadat | .................. | G06Q 30/02 705/14.53 |

(Continued)

FOREIGN PATENT DOCUMENTS

WO    WO-2009023734 A1 *   2/2009    ............. G06Q 30/00

OTHER PUBLICATIONS

"Plug-in (computing)", Wikipedia, May 7, 2012, https://en.wikipedia.org/w/index.php?title=Plug-in_(computing)&oldid=491164657.*

(Continued)

*Primary Examiner* — Michael Bekerman
*Assistant Examiner* — Scott Snider
(74) *Attorney, Agent, or Firm* — Ferguson Braswell Fraser Kubasta PC (57) ABSTRACT

A method for selecting advertisements to embed in an online application, including detecting an access to the online application by a customer, determining, based on an impression tracker associated with the customer, and using an ad type selection model, an advertisement to embed in the online application. The advertisement is displayed to the user and the impression tracker associated with the customer is incremented. The method further includes receiving, from the user, a selection of the advertisement, storing a type of the advertisement and the value of the impression tracker as (Continued)

ad selection data, determining that the ad type selection model needs to be updated, and updating the ad type selection model based on the ad selection data to obtain an updated ad type selection model.

20 Claims, 8 Drawing Sheets

(56) References Cited

U.S. PATENT DOCUMENTS

| | | | | |
|---|---|---|---|---|
| 2010/0312884 | A1* | 12/2010 | Nandy | G06F 17/30489 709/224 |
| 2011/0022460 | A1* | 1/2011 | Bhatia | G06Q 30/02 705/14.46 |
| 2013/0275580 | A1* | 10/2013 | Chamiel | H04L 67/22 709/224 |

OTHER PUBLICATIONS

"Unique User", Wikipedia, May 28, 2012, https://en.wikipedia.org/w/index.php?title=Unique_user&oldid=494748066.*

Buchbinder N., Feldman M., Ghosh A., Naor J.. (2011) Frequency Capping in Online Advertising. In: Dehne F., Iacono J., Sack JR. (eds) Algorithms and Data Structures. WADS 2011. Lecture Notes in Computer Science, vol. 6844. Springer, (Year: 2011).*

Hsieh, Y.-C., Chen, K.-H. and Ma, M.-Y. (2012) 'Retain viewer's attention on banner ad by manipulating information type of the content', Computers in Human Behavior, 28(5), pp. 1692-1699. doi: 10.1016/j.chb.2012.04.008. (Year: 2012).*

\* cited by examiner

| Customer ID | Number of Impressions | Advertisement Type |
|---|---|---|
| 1 | 1 | Four Link |
| 2 | 1 | Four Link |
| 3 | 1 | Four Link |
| 4 | 2 | Four Link |
| 5 | 2 | Four Link |
| 6 | 2 | Four Link |
| 7 | 3 | Four Link |
| 8 | 3 | Four Link |
| 9 | 3 | Four Link |
| 10 | 4 | Four Link |
| 11 | 4 | Four Link |
| 12 | 4 | Four Link |
| 13 | 1 | Detailed |
| 14 | 1 | Detailed |
| 15 | 1 | Detailed |
| 16 | 1 | Detailed |
| 17 | 1 | Detailed |
| 18 | 2 | Detailed |
| 19 | 2 | Detailed |
| 20 | 2 | Detailed |
| 21 | 3 | Detailed |
| 22 | 3 | Detailed |

*FIG. 6A*

| Number of Impressions | Number of purchases based on detailed advertisement | Number of purchases based on four link advertisement |
|---|---|---|
| 1 | 3 | 5 |
| 2 | 3 | 4 |
| 3 | 3 | 1 |
| 4 | 3 | 0 |

*FIG. 6B*

| Number of Impressions | Fraction of total detailed advertisement purchases | Fraction of total four link advertisement purchases | Difference between fractions of selection |
|---|---|---|---|
| 1 | 3/12 = .25 | 5/10 = .5 | .5 - .25 = .25 |
| 2 | 3/12 = .25 | 4/10 = .4 | .4 - .25 = .15 |
| 3 | 3/12 = .25 | 1/10 = .1 | .1 - .25 = -.15 |
| 4 | 3/12 = .25 | 0/10 = 0 | 0 - .25 = -.25 |

*FIG. 6C*

| Number of Impressions | Adjusted difference | Natural logarithm of adjusted difference | Benefit of showing detailed advertisement |
|---|---|---|---|
| 1 | .25 | -1.38294 | 1 |
| 2 | .15 | -1.897120 | .53 |
| 3 | .001 | -6.907755 | .03 |
| 4 | .001 | -6.907755 | 0 |

METHOD AND SYSTEM FOR SELECTING ADVERTISEMENTS TO MINIMIZE AD FATIGUE

BACKGROUND

Embedded advertising may be used to conveniently market products to easily identified target demographics. A single advertisement embedded in a product used commonly by a user may subject the user to 'ad fatigue.' Data is typically collected about the number of times a user views a single ad. Data can be collected about when a user selects an ad, and when the user purchases the product being advertised. Regression analysis may be used to fit a function to a set of data points. The fitted function may be used to generate ideal data points based on the fitting.

SUMMARY

In general, in one aspect, the invention relates to a method for selecting advertisements to embed in an online application. The method includes detecting an access to the online application by a customer, determining, based on an impression tracker associated with the customer, and using an ad type selection model, an advertisement to embed in the online application, displaying, to the user, the advertisement, incrementing the impression tracker associated with the customer, receiving, from the user, a selection of the advertisement, storing a type of the advertisement and the value of the impression tracker as ad selection data, determining that the ad type selection model needs to be updated, and updating the ad type selection model based on the ad selection data to obtain an updated ad type selection model.

In general, in one aspect, the invention, relates to a system for selecting an advertisement to embed in an online application. The system includes a computer processor and memory, operatively connected to the computer processor, an online application including the advertisement, and further including an advertisement recommendation engine, stored in memory, executing on the computer processor, and including functionality to detect an access to the online application by a customer, determine, based on an impression tracker associated with the customer, and using an ad type selection model, the advertisement to embed in the online application, increment the impression tracker associated with the customer, receive, from the user, a selection of the advertisement, and store, after the selection, a type of the advertisement and the value of the impression tracker as ad selection data, a selection model manager stored in memory, executing on the computer processor, and including functionality to determine that the ad type selection model needs to be updated and update the ad type selection model based on the ad selection data to obtain an updated ad type selection model, and a database including functionality to store the customer impression data and the ad selection data.

In general, in one aspect, the invention relates to a non-transitory computer readable medium storing computer executable instructions. The computer executable instructions include functionality to detect an access to an online application by a customer, determine, based on an impression tracker associated with the customer, and using an ad type selection model, an advertisement to embed in the online application, display, to the user and within the online application, the advertisement, increment the impression tracker associated with the customer, receive, from the user, a selection of the advertisement, store a type of the advertisement and the value of the impression tracker as ad selection data, determine that the ad type selection model needs to be updated, and update the ad type selection model based on the Ad selection data to obtain an updated ad type selection model.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for selecting advertisements based on a customer's exposure to the ads. Customer access to an online application may be observed and recorded, along with frequency and the type of advertisements the customer was exposed to, which may be stored as advertisement 'impressions.' The number of impressions that a customer indicates for a given ad may be used to determine what type of ad the customer should be shown when using the online application. The ad types may include a detailed description advertisement, which includes a link to, and data about a single product, and a multiple link advertisement, which includes links to many products, including the product which may be advertised in the detailed description advertisement. An ad type selection model may be used to determine one of the two types of advertisement to show the customer based on the number of impressions recorded for the customer. The ad type selection model may be kept up to data by a selection model manager, which uses analysis of the selection of ads and the number of impressions at the time of the selection to determine a form for the ad type selection model.

Figure 1:
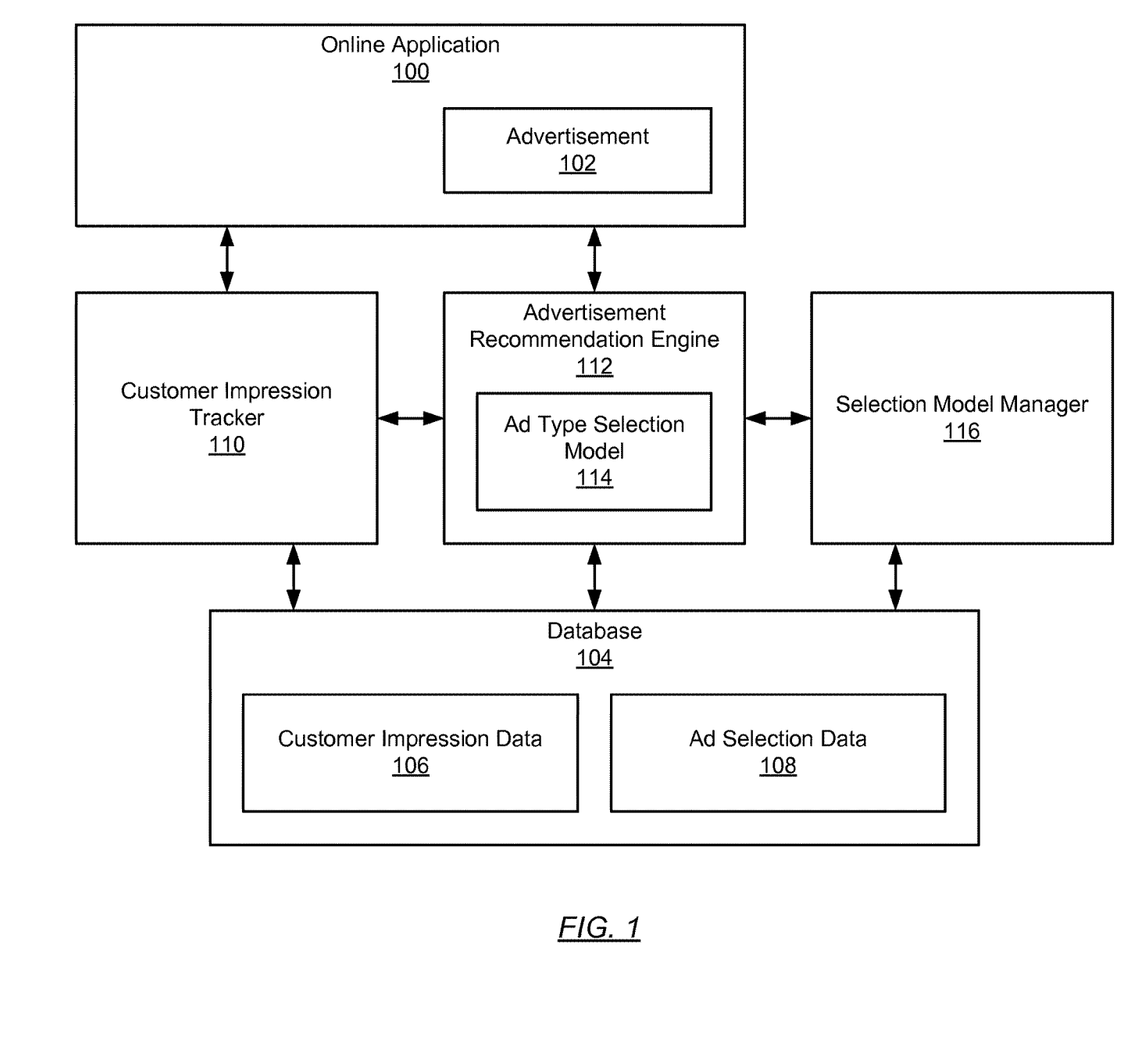
FIG. 1 shows a diagram of a system for selecting an advertisement to be embedded in a web-based service of a user in accordance with one embodiment of the invention.

FIG. 1 shows a system for selecting an advertisement to embed within an online application (100) in accordance with one embodiment of the invention. The online application (100) may include a designated space to display an advertisement (102). The system may include functionality to access a database (104) which stores customer impression data (106) and ad selection data (108). The system may further include an advertisement recommendation engine (112), which includes functionality to detect that a customer is using the online application (100), and select an advertisement (102) to display based on the customer impression data (106) and ad type selection model (114). The advertisement recommendation engine (112) may also include functionality to detect customer interaction with the advertisement (102), and to modify the ad selection data (108) accordingly. In one embodiment of the invention, the system includes a selection model manager (116) which includes functionality to modify the ad type selection model (114) based on changes to the ad selection data (108).

In one embodiment of the invention, the online application (100) is a computer program with functionality to interact with customers or other entities over the internet. The online application (100) may be provided by a website and accessed by the user through an Internet browser. Alternatively, the online application (100) may be a locally executed application which accesses other applications and services over the Internet. A customer may be required to have an account or customer ID in order to use the online application. Alternatively the online application (100) may i) identify customers via a unique IP address associated with the customer; ii) perform verification of the customer's identity by a third party; or iii) be associated with a single application. A single customer may be an entity with multiple distinct users, who may be treated as a single customer, or as multiple distinct customers.

In one embodiment of the invention, the online application (100) may be a financial management application. The financial management application may be, for example, accounting software, tax preparation software, or software directed to performing other finance related tasks. The financial management application may be a website based service hosted on a remote server and accessed via a secure connection through a browser, or a locally executed program including functionality to communicate over a network connection with the remote server, financial institutions, online retailers, or other financial management applications.

Returning to FIG. 1, in one embodiment of the invention, the online application (100) includes functionality to display an advertisement (102) embedded within a display (not shown) or user interface (not shown) of the online application (100). The advertisement (102) may advertise a product or service. The contents of the advertisement (102) may be selected by the online application (100) or provided by a third party. The advertisement (102) may be one of a variety of types, which include various combinations of multiple products, images, descriptions and other information related to the products. The different types of advertisement (102) are discussed in detail in the description of FIG. 2 below.

In one embodiment of the invention, the advertisement (102) may include one or more links to the products being advertised. The links, when accessed, may lead to a third party site which is selling the product, or may show a purchasing option within the online application (100). In one embodiment of the invention, the product in the advertisement is an expansion or unlockable feature of the online application (100). In one embodiment of the invention, in which the online application (100) is a financial management application, the products or service linked to by the advertisement may include, for example, a payroll management add-on for the financial management application, or the option to activate a credit card, checks, loan applications and other finance related products and services.

In one embodiment of the invention, the advertisement selection system includes a database (104). The database (104) may be used to store customer identification information, customer impression data (106), ad selection data (108), and other data relevant to the online application (100). The database (104) may be local or accessed remotely via a network. In one embodiment of the invention, different types of data may be stored in different databases (104) at different locations. The database (104) may be accessed as needed by the advertisement recommendation engine (112) and the selection model manager (116). Alternatively, changes or updates to the contents of the database (104) may be pushed to the advertisement selection system, or retrieved by alternate components.

In one embodiment of the invention, customer impression data (106) is stored in the database (104). The customer impression data (106) may be locally stored for only the users of a particular functionality of the online application (100). Alternatively, customer impression data (106) for all users of the online application (100) may be stored centrally and accessed by the online application (100) as needed. The customer impression data (106) may include many impression trackers each of which is associated with a specific customer ID and type of advertisement. An impression may be a predetermined quantity of exposure to a particular advertisement. The impression trackers track the number of times that a user with the customer ID has been exposed to a particular advertisement. An impression tracker may be incremented when a single pageview is recorded that is associated with a particular customer ID or IP address. Alternatively, an impression tracker may be incremented for every day in which a pageview is recorded. Alternative time periods may also be used.

In one embodiment of the invention, an impression tracker is may be reset after a certain time period has elapsed. For example, if an impression tracker is incremented for each day in which an impression occurs, the impression tracker may be reset weekly, monthly or on some other schedule. In one embodiment of the invention, the customer impression data (106) may include other data, such as timestamps, the frequency of impressions, impressions associated with different IP addresses associated with a particular customer ID, the duration of the pageview, and other data on the usage habits of customers of the online application (100). This other data may be used to manage the increment counters. For example, if a certain period of time passes with no new impressions, an impression tracker may be reset.

Returning to FIG. 1, in one embodiment of the invention, ad selection data (108) may be stored in the database (104). The ad selection data (108) may be obtained from customer impression data (106) of multiple online applications (100). The ad selection data (108) may include data not included in the customer impression data (106), such as information related to the selections of advertisements (102), or subsequent purchases. In one embodiment of the invention, the ad selection data (108) includes, for example, a list of all the customers who selected an advertisement (102), the values of the impression trackers of those customers when the selection was made, the product being advertised, and the type of the advertisement (102). Additional ad selection data (108) may include whether a purchase was made subsequent to the selection of the advertisement (102) by the customer, how many times the advertisement (102) was selected by the customer prior to the purchase, what the customer was doing with the online application (100) at the time of purchase, and other potentially relevant data regarding the selection of the advertisement (102).

In one embodiment of the invention, the ad selection data (108) may initially be collected through experimentation or studies conducted by the advertiser or an administrator of the advertisement selection system. In one embodiment of the invention, the ad selection data (108) initially used may be determined based on observed trends for other advertisements (102). The advertisements (102) and trends used to obtain initial ad selection data (108) may be selected based upon similarities in price, utility, customer base, and other factors. In one embodiment of the invention, experiments or surveys may be conducted to identify parameters or specific values of the parameters relevant to calculating an ad type selection model (114). The values and parameters may be used to determine which advertisements (102) to base the initial ad selection data (108) on, or may be used directly in the ad selection data (108). In one embodiment of the invention, an ad type selection model (114) may be calculated or obtained directly by the advertiser/administrator and for initial use in the advertisement type selection.

As customer impression data (106) is collected, the ad selection data (108) may be updated or replaced with additional data derived from the original ad selection data (108) and the collected customer impression data (106). The ad selection data (108) may be a condensed or reduced subset of the customer impression data (106) of multiple customers. For example, instead of storing the ad selection data (108) as a field that includes only the details specific to a particular customer, a field may be used that includes only a number of customers with the same data. The additional data derived from the customer impression data (106) may include, for example, the total number of customers who selected an advertisement (102) based on a given number of impressions, or what proportion of the total customers who selected an advertisement (102), did so based on a given number of impressions. In one embodiment of the invention, the above categories of data, as well as others are calculated and stored by the selection model manager (116) when the ad type selection model (114) is being updated.

In one embodiment of the invention, the customer impression tracker (110) monitors the online application (100). The customer impression tracker (110) may include functionality to monitor customer access to an online application (100). The customer impression tracker (110) may store details Customer IDs, number of accesses to the online application (100), date and times at which accesses occurred, tasks performed within the online application (100), the creation, access, modification, and deletion of items and files within the online application (100), and other similar usage data. The data collected may include the data stored in the customer impression data (106), as well as other information related to the customer interaction with the advertisement (102) displayed. The customer impression tracker (110) may further include functionality to monitor other services or applications accessed by the customer that are associated with the advertisement (102) or online application (100). For example, if the advertisement (102) links to an online retailer, or a specific purchasing site, the customer impression tracker (110) may be able to observe whether the selection of the advertisement (102) led to a purchase.

In one embodiment of the invention, the customer impression tracker (110) may be a component or built in feature of the online application (100), which interacts with other components of the advertisement selection system, or which provides. Alternatively, the customer impression tracker (110) may be an external component which leverages the user interface of the online application (100) to monitor the user. The customer impression tracker (110) may include functionality to directly access the database (104) and to store the collected data directly as the customer impression data (106). In this case, the customer impression tracker may include functionality to process the data to separate out useful or required data. Alternatively, the customer impression tracker (110) may pass collected data to the advertisement recommendation engine (112), which performs the processing and writes the customer impression data (106) to the database. In one embodiment of the invention, the customer impression tracker (110) may write some data directly to the database as customer impression data (106) and pass other information to the advertisement recommendation engine (112). For example, customer impression data (106), which is not immediately used, may be written to the database (104); whereas detecting a login event from particular customer ID may require a selection of an advertisement (102) for that customer ID, so the advertisement recommendation engine (112) is notified immediately.

In one embodiment of the invention, the advertisement recommendation engine (112) is a component of the advertisement selection system which includes functionality to analyze customer impression data (106), ad type selection models (114), and other sources of information to determine what the content and type of the advertisement (102) should be, to maximize the likelihood of selection by a particular customer. The advertisement recommendation engine (112) may be integrated with the online application (100) in which the advertisement (102) is being displayed. Alternatively, the advertisement recommendation engine may be an external process that has access privileges to all or part of the online application (100), or is able to access required data via the customer impression tracker (110), or a similar mechanism. In one embodiment of the invention, the advertisement recommendation engine (112) may be operated by a third party provider. The advertisement recommendation engine (112) may include functionality to obtain information and tools for selecting an advertisement (102) from the customer impression tracker (110), the selection model manager (116), directly from the online application (100), by reading, or requesting information from the database (104), and by accessing other sources. The advertisement recommendation engine (112) may further include functionality to modify the customer impression data (106) and ad selection data (108). Such modifications may be in response to the acquisition of new or updated data, or to store the results of the processing or calculations performed upon the already stored data.

In one embodiment of the invention, the advertisement recommendation engine (112) includes functionality to determine whether to display an advertisement (102) by identifying from the customer impression data (106) a number of impressions of the advertisement recorded for the customer has already had and by calculating, using the number of impressions and an ad type selection model (114) a percentage of the time that the advertisement (102) should be shown to maximize the efficacy of the advertisement (102). The advertisement recommendation engine (112) may include functionality to obtain an updated ad type selection model (114) from a selection model manager (116). In one embodiment of the invention, the advertisement recommendation engine (112) may include the functionality of the selection model manager (116) and keep the ad type selection model (114) up-to-date itself. Alternatively, the advertisement recommendation engine (112) may send a request the selection model manager (116) to recalculate the ad type selection model (114). The request may be made based on a fixed schedule, in response to certain criteria being met, or according to some other stimuli. In one embodiment of the invention, the advertisement recommendation engine (112) simply acquires the ad type selection model (114) each time it is used, and the selection model manager (116) performs the updating autonomously.

In one embodiment of the invention, the advertisement recommendation engine (112) selects the advertisement (102) using an ad type selection model (114). As mentioned above, the ad type selection model (114) may be local to the advertisement recommendation engine (112) and kept accurate for recently observed data by the advertisement recommendation engine (112) itself or by an external selection model manager (116). Alternatively, the ad type selection model (114) may be stored externally and only accessed as needed by both the advertisement recommendation engine (112) and the selection model manager (116). In one embodiment of the invention, the selection model manager (116) may send a new ad type selection model (114) to the advertisement recommendation engine (112) every time an updated version is generated. Alternatively, the ad type selection model (114) may be regenerated by the selection model manager (116) each time it is required.

In one embodiment of the invention, the ad type selection model (114) may be a table of data that is created by a mathematical function which maps a certain number of impressions to a particular type of advertisement (102) or product to be advertised. Alternatively, the ad type selection model (114) may be a mathematical function itself. The mathematical function may be an exponential probability function based on a volume of collected ad selection data (108). In one embodiment of the invention, the ad type selection model (114) is determined by an exponential probability function of the form:

$$Y = e^{(a+b)X}$$

Where 'X' is the number of impressions for a particular customer, 'Y' is the probability of showing a given type of advertisement (102), 'e' is the natural constant, and 'a' and 'b' are variables determined using regression analysis of a dataset obtained from the ad selection data (108). For example, the dataset used may be a mapping of a number of impressions to the advantage of one ad type over another. The advantage may be calculated by obtaining a fraction of the total selections of the first ad type that occurred after a number of impressions, and subtracting the fraction of the total selections of a second ad type that occurred after that number of impressions, i.e. the percent advantage of one ad type versus a second ad type for that number of impressions. Thus, for a number of impressions 'X', if the advantage F of a first ad type over a second is zero, there is no reason to prefer the first ad type over the second. Other calculated metrics may be used to determine the advantageousness of different ad types without straying from the scope of the invention.

In one embodiment of the invention, the ad type selection model (114) is maintained by a selection model manager (116). The selection model manager (116) may include functionality to monitor the database (104) and online application (100). Alternatively the selection model manager (116) may be controlled or include functionality to receive instructions or prompts from the advertisement recommendation engine (112). The ad type selection model (114) may include detecting changes to the dataset upon which the ad type selection model (114) is based, and recalculating the model using the new data. Recalculating the ad type selection model (114) may include generating a new dataset, based upon the ad selection data (108) and using regression analysis of the new dataset and the mathematical model being used to identify new constants to be used in the mathematical model. In one embodiment of the invention, if the advertisement (102) is being shown for the first time, an ad type selection model (114) based on preliminary experimentation may be provided by or obtained directly from the advertiser or an administrator of the advertisement selection service. Alternatively, the ad type selection model (114) may generated using data provided directly by the advertiser or administrator, which was determined based upon results of the preliminary experimentation.

Using the previous example, in order to recalculate the ad type selection model (114), the selection model manager (116) would first obtain the natural logarithm of the percentage advantage of the first ad type over the second ad type for each number of impressions. Applying the natural logarithm to both sides of the exponential function would cancel 'e' (the natural constant) and the resulting equation would be a linear function on the domain of the number of impressions. In this example, the constants 'a' and 'b' are related to an offset and slope of the linear function respectively, and are modified to obtain a line which maps the data points represented by the logarithm of the percentage advantages for each number of impressions most closely. The ad type selection model (114) used by the advertisement recommendation engine (112) is then updated to include the new values derived from the function using the newly found 'a' and 'b'.

Figure 2A:
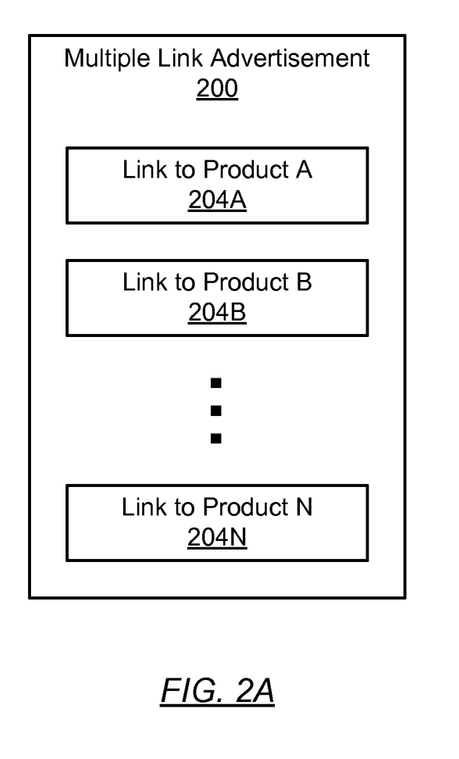
FIGS. 2A and 2B show diagrams of two types of embedded advertisements in accordance with one embodiment of the invention.
Figure 2B:
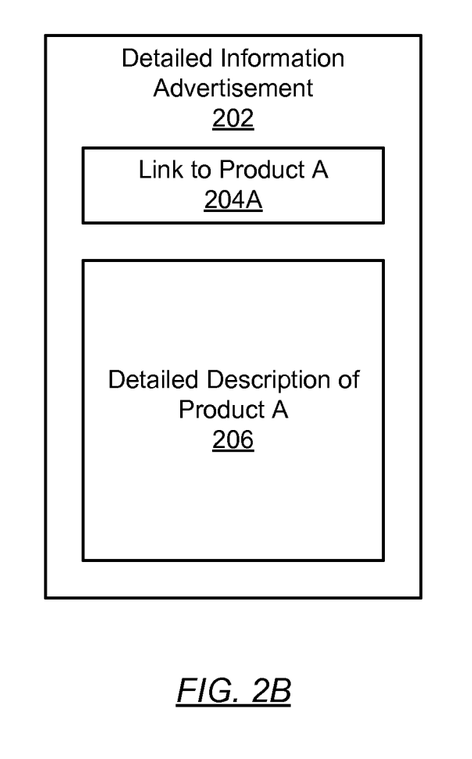

FIGS. 2A and 2B show diagrams of different types of advertisement that may be embedded in the online application.

FIG. 2A shows a multiple link advertisement (200) in accordance with one embodiment of the invention. A multiple link advertisement (200) is an advertisement which includes links to multiple products (e.g., link to product A (204A), link to product B (204B), link to product N (204N)). The links (e.g., link to product A (204A), link to product B (204B), link to product N (204N)) may connect to websites, open a dialog box, or automatically purchase the product in question. The products advertised within a multiple link advertisement (200) may be selected from a larger list; the selection of products may be random or based on other factors such as usage patterns, customer ID, location and others. The products to which the links (e.g., link to product A (204A), link to product B (204B), link to product N (204N)) correspond, may be related to the application in which the multiple link advertisement (200) is displayed. For example, if the application is a financial management application, the different links (e.g., link to product A (204A), link to product B (204B), link to product N (204N)) may advertise products such as credit cards, checks, loans and others. Further, the links (e.g., link to product A (204A), link to product B (204B), link to product N (204N)) may include additions or expansions to the application itself. Using the previous example, links (e.g., link to product A (204A), link to product B (204B), link to product N (204N)) advertised may include a payroll calculator, tax preparation software, or other purpose specific financial software that may be added on to a more generic financial management application.

FIG. 2B shows a detailed information advertisement (202) in accordance with one embodiment of the invention. A detailed information advertisement (202) includes a link to product A (204A) (i.e., a single product or service) and a detailed description of product A (206) (i.e., the product or service). The link is essentially the same as those discussed in the above description of FIG. 2A. In one embodiment of the invention, a detailed information advertisement (202) may be used interchangeably. The detailed description of product A (206) may include text or images describing the product or service being advertised.

Figure 3:
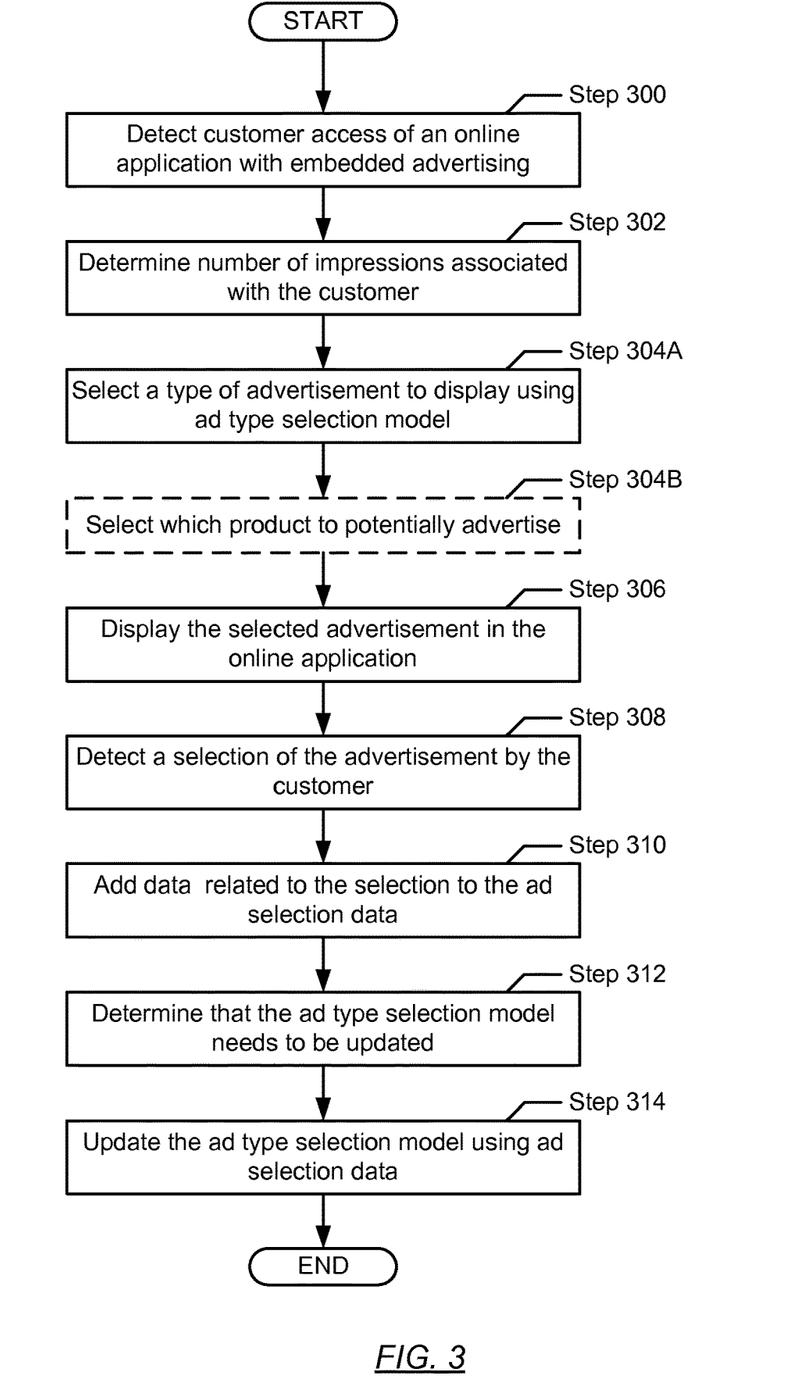
FIG. 3 shows a flowchart for selecting a type of advertisement in accordance with one embodiment of the invention.

FIG. 3 shows a flowchart describing steps to perform a method for selecting an advertisement to display to a customer in accordance with one embodiment of the invention. While the various steps in the flowchart are presented and described sequentially, one of ordinary skill will appreciate that some or all of the steps may be executed in different orders, may be combined or omitted, and some or all of the steps may be executed in parallel.

In Step 300, a customer access of an online application with an embedded advertisement is detected. The customer ID of the customer accessing the website may be detected by the online application observing a request coming from the specific IP address, by the customer providing credentials at login, by the execution of an application associated with that user, or by identifying other characteristics of the access request. In one embodiment of the invention, the advertisement selection system may be automatically alerted that a customer access has occurred by the online application, and update the advertisement being displayed accordingly. Alternatively, the online application may provide data associated with the customer access to advertisement selection system, and request an appropriate advertisement based upon the access.

In Step 302, the number of impressions of an advertisement associated with the customer is determined. The number of impressions a customer has may be determined multiple ways. In one embodiment of the invention, an impression may simply be the number of times that a customer has been exposed to a specific advertisement. In this case, a counter associated with the customer and the advertisement is incremented, and the value is used to determine which advertisement to show. Alternatively, an impression may be the number of times a user has been exposed to an advertisement for a product, regardless of the type of the advertisement. In this case, impression trackers associated with all of the advertisements for that product are incremented. An impression may also include fixed periods of time in which multiple exposures to an advertisement may qualify as a single impression. In this case, a flag may indicate whether the customer has not been exposed to the advertisement within a certain time period. If the flag indicates that the user has not been impressed, the flag is set, and the counter is incremented. The metadata associated with customer impressions may be local to the advertisement selection system, or it may require an external database to be accessed. The data collected may include all of the impressions of the customer, or just those related to a specific product.

In Step 304A, a type of advertisement to display for the customer is selected using an ad type selection model in accordance with one or more embodiments of the invention. In one embodiment of the invention, an up-to-date ad type selection model may be obtained prior to the determination of the advertisement. The ad type selection model may be a mathematical function, which takes the number of impressions of the customer as input and outputs a number representing a selection of advertisement. In one embodiment of the invention, the mathematical function is an exponential probability function, which outputs a percent advantage in selection rates of a first ad type over a second ad type at a certain number of impressions. In this embodiment, the output percentage may be used to determine a type of advertisement to show, preferring, for example the first type of advertisement when there is a non-negligible advantage. Alternatively, the percent advantage may be used as a probability where the first advertisement is shown with a probability equal to the advantage.

In Step 304B, in addition to selecting between first and second ad types, a product to potentially advertise is selected in accordance with one or more embodiments of the invention. In one embodiment of the invention, the first ad type may be a detailed description advertisement that includes only a single product, whereas the second ad type may be a multiple link advertisement, which includes multiple products in a single advertisement. Thus, multiple products from the second advertisement may potentially be used in the first ad type. In one embodiment of the invention, the product to advertise is selected by performing the steps detailed in Step 304A to obtain the individual percent advantage for each of the first ad types.

In Step 306, the advertisement selected in Steps 304A and 304B is displayed to the customer in the online application. The advertisement may be embedded within a preselected location in the user interface of the online application. Alternatively, a pop-up window may be displayed to the user. In one embodiment of the invention, type and product may determine the size, placement and function of the advertisement. In one embodiment of the invention, the advertisement may be implemented within the online application by the advertisement selection system directly. Alternatively, the online application may manage the advertisement itself, and only use the advertisement selection system to determine which type of advertisement to display.

In Step 308, a selection of the advertisement by the customer is detected. The selection may constitute a click on a link of the advertisement. In response to the selection of the link, the user may be taken to an online retailer or presented with a dialog box to purchase the product or service. The selection may be detected by the advertising selection system directly, or the advertising selection system may be notified by the online application. In one embodiment of the invention, a third party to which the advertisement links may notify the advertisement selection system of the selection. The selection may further include details on whether a purchase was made subsequent to the selection of the advertisement.

In Step 310, details related to the selection of the advertisement by the customer are stored by the advertisement selection system as ad selection data. The ad selection data may be stored locally, or uploaded to a remote database. The ad selection data may include data needed to generate a model of the characterizing the conditions of the selection by the customer. This data may include the product or products being advertised, the type of the advertisement, the number of impressions the customer had of this advertisement and of other advertisements, and other potentially useful data. The ad selection data may be stored raw, or it may be combined with similar data collected from other customers in a generic form.

In Step 312, it is determined that the ad type selection model needs to be updated. This determination may be made in response to adding, or detecting the addition of, new data to the ad selection data. Alternatively, the ad type selection model may be updated according to a predetermined schedule. In one embodiment of the invention, the model may be updated every time it is used to select an advertisement.

In Step 314, the ad type selection model is updated. Updating the ad type selection model may include extracting and processing data from the ad selection data to obtain a dataset to use as a basis for the new ad type selection model. The model may then be fitted to the dataset by identifying appropriate values of constants in the mathematical function used in the model. The method by which the ad type selection model is generated is explained in detail in the description of FIG. 4 below.

Figure 4:
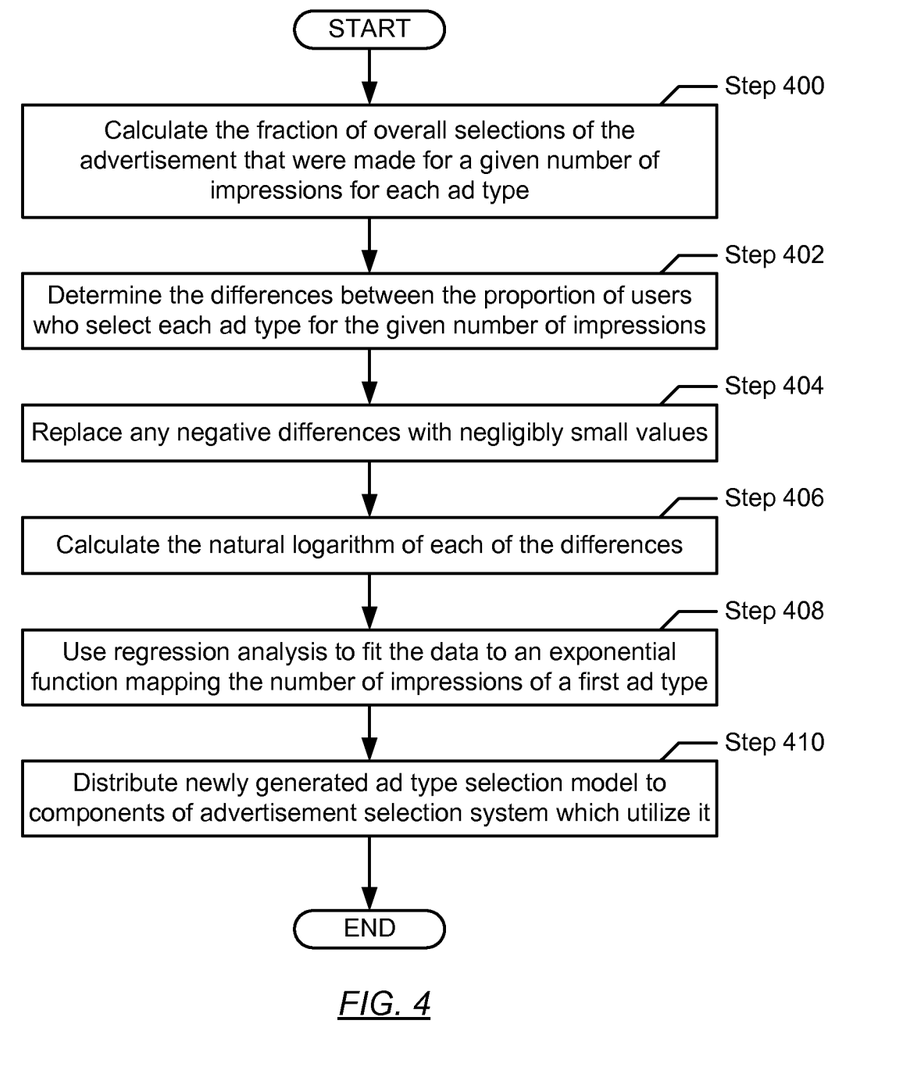
FIG. 4 shows a flowchart for generating an ad type selection model in accordance with one embodiment of the invention.

FIG. 4 shows a flowchart describing steps to generate an ad type selection model by fitting an exponential probability function to an observed dataset in accordance with one embodiment of the invention.

In Step 400, the percentage of total selections of a first type of advertisement that were made after a given number of impressions and the percentage of total selections of a second type of advertisement that were made after a given number of impressions is calculated.

In Step 402, the proportional differences between the user who selected each ad type is determined, whereby the percentage of the second type of advertisement is subtracted from the percentage of the first type of advertisement for a given number of impressions. The resulting number is the percentage of customers who selected an advertisement that otherwise may not have if the selected advertisement had been of the second type instead of the first. Calculated for every potential number of impressions, this percentage allows the identification of the number of impressions where customers become sufficiently fatigued with the first type of advertisement to the point that it no longer offers a benefit over the second type of advertisement.

For example, if the first advertisement is a detailed description advertisement it offers benefit in garnering customer selections of the described product over the second type, the multiple link advertisement; however, if the customer becomes fatigued to the point that the selection rate is the same as for the detailed description advertisement and the multiple link advertisement, the multiple link advertisement is preferable, as more products are advertised.

In Step 404, the values of the differences calculated in Step 402 which are zero or negative are replaced with negligibly small values. As the differences represent the percent advantage of the first ad type over the second ad type for that number of impressions, a sufficiently small value, for example, (e.g., 0.001), is sufficient to demarcate that there is no advantage.

In Step 406, the natural logarithm of the differences in the dataset is calculated. As the function used in the advertisement effectiveness module is exponential, and is mapping the number of impressions to the advantage of the first advertisement, the natural logarithm of the output is equal to the natural logarithm of the function. In the case that the function is of the form $Y=e^{(a+bX)}$, $\ln(Y)=\ln(e^{(a+bX)})$ is equivalent to $\ln(Y)=a+bx$, which is much easier to manipulate in order to fit the model to the dataset.

In Step 408, the newly generated type selection model is distributed to components of the advertisement selection system. Regression analysis is performed using the linear function and the dataset. Specifically, the offset and the slop of the linear function derived from the exponential function are the constants 'a' and 'b' respectively. These values are adjusted to best fit the line of the linear function to a plot of the data points of the dataset. The plot used may have the number of impressions on the 'x' axis and the natural logarithm of the calculated advantages on the 'y' axis. In one embodiment of the invention, the data points and the line are not actually plotted, and the best fitting line is determined using purely abstract algorithms. Once the best fitting combination of constants has been determined, the constants are added back to the original exponential function, which may then be used to calculate the percent advantage for a given advertisement based on a given number of impressions.

In Step 410, this newly determined exponential function may be distributed to the advertisement selection systems as the ad type selection model. In one embodiment of the invention, the only element of the exponential function which is passed to the components of the advertisement selection system is the newly determined variables. Alternatively, the component which generated the ad type selection model may be tasked with implementing the functionality, with only the input and output to the model being transmitted to and from other components. In one embodiment of the invention, the ad type selection model may be used to generate a table of common input and output which is distributed or used in its stead.

Figure 5:
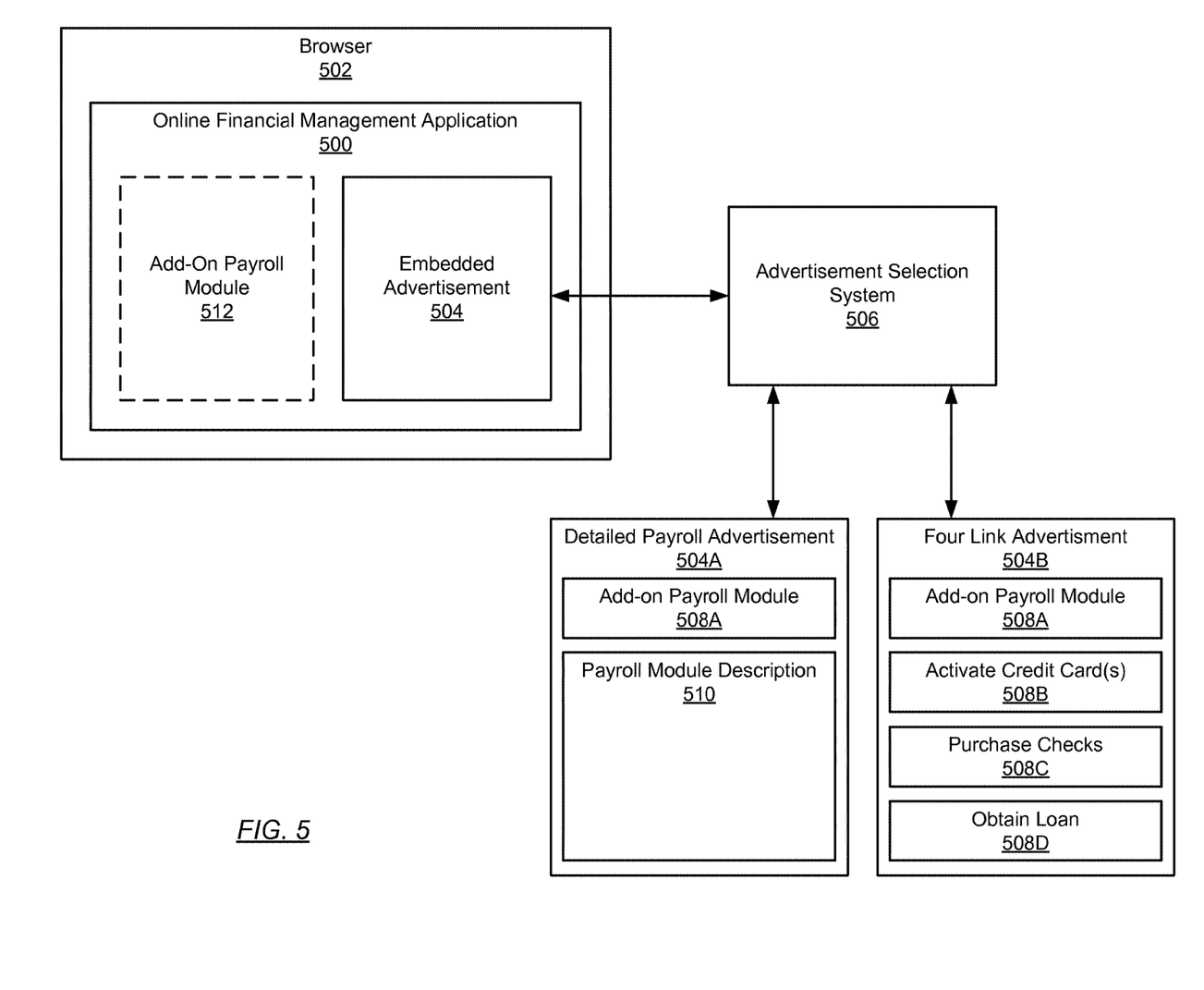
FIG. 5 shows an example for selecting an advertisement to embed in an online financial management application in accordance with one embodiment of the invention.

FIG. 5 shows an example of the advertisement selection system in operation in accordance with one embodiment of the invention. FIG. 5 and the example presented below are for explanatory purposes only, and are not intended to limit the scope of the invention.

In the example, a customer accesses an online financial management application (500) by loading a website using their browser (502). The customer is prompted with a login page of the online financial management application (500) and is asked for a unique Customer ID. The customer provides the unique Customer ID, to the online financial management application (500), which sends a request to an advertisement selection system (506) for an appropriate selection of an advertisement (504) to display to the customer. Included in the request is the Customer ID.

The available advertisements are a detailed payroll advertisement (504A) and a four link advertisement (504B). The detailed payroll advertisement (504A) includes a link (508A) to a purchase site of an add-on payroll module (512) of the online financial management application (500); the detailed payroll advertisement (504A) also includes a payroll module description (510). The four link advertisement (504B) includes four links including the same link (508A) to the add-on payroll module (512) included in the detailed payroll advertisement (504A) has. The other links include options to activate credit cards (508B), purchase checks (508C), and obtain a loan (508D).

The advertisement selection system (506) accesses usage data for the online financial management application (500), and locates data related to the customer. The advertisement selection system (506) accesses an impression tracker associated with the advertisements for an add-on payroll module (512) of the online financial management application (500). The impression tracker tracks the customer's impressions of the advertisement. Each impression represents a day in which the customer viewed an advertisement for the add-on payroll module (512) at least once. The advertisement selection system (506) obtains an ad type selection model based on observed ad selection data. The ad type selection model is a mapping obtained from an exponential probability function. In the ad type selection model, the number of impressions of an advertisement for an add-on payroll module is mapped to the probability that the add-on payroll module link (508A) in the detailed payroll advertisement (504A) is selected over the add-on payroll module link (508A) in the four link advertisement (504B). The exact method by which the ad type selection model is generated is discussed in the example covered by FIGS. 6A-6D. After the advertisement has been selected, it is embedded in the online financial management application (500). Finally, a determination is made as to whether the customer has encountered an advertisement for the add-on payroll module (512) that day. If not, the advertisement selection system (506) increments the impression tracker by one.

FIGS. 6A-6D show steps in an example of generating an advertising effectiveness model in accordance with one embodiment of the invention. FIGS. 6A-6D and the example presented below are for explanatory purposes only, and are not intended to limit the scope of the invention.

Figure 6A:
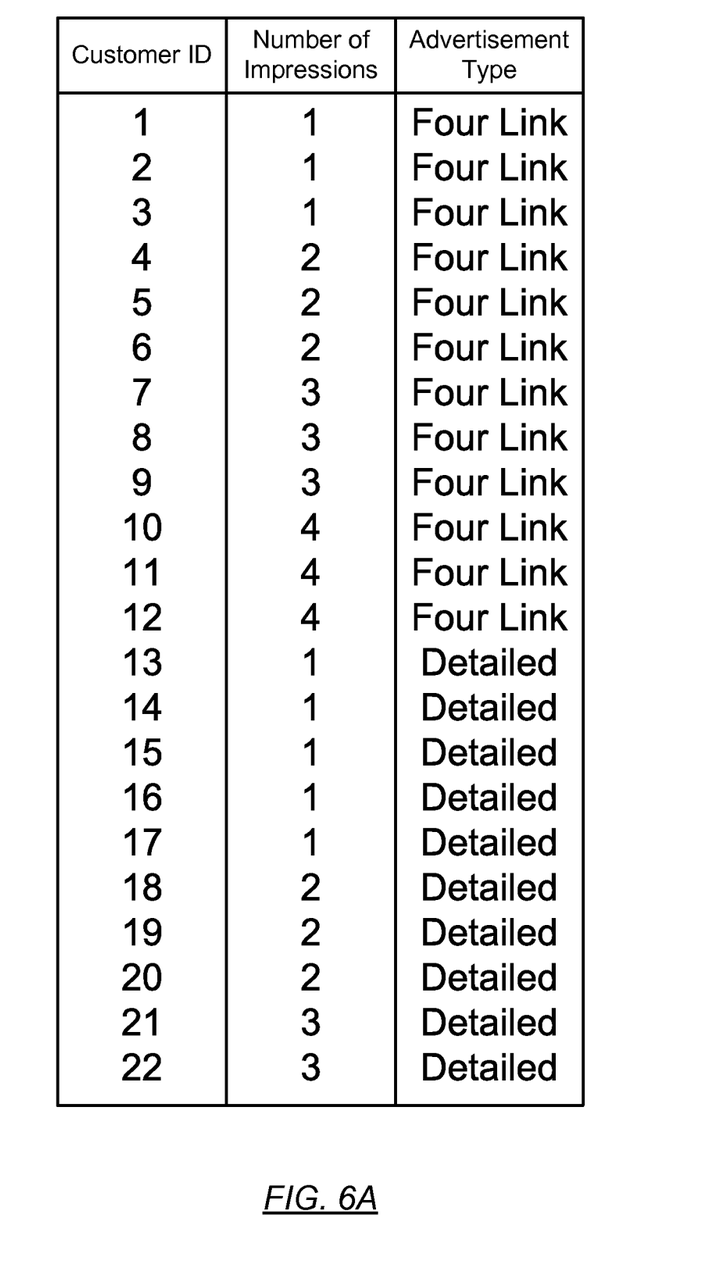
FIGS. 6A, 6B, 6C, and 6D show an example for using ad selection data obtained from an online financial management application to generate an updated ad type selection model in accordance with one embodiment of the invention.

As shown in FIG. 6A, data is collected on the number of impressions that all customers who have purchased a product had when they selected the advertisement. This data may be collected for all types of advertisements and stored within a database as a data structure, such as a table, list, array, or other structure.

Figure 6B:
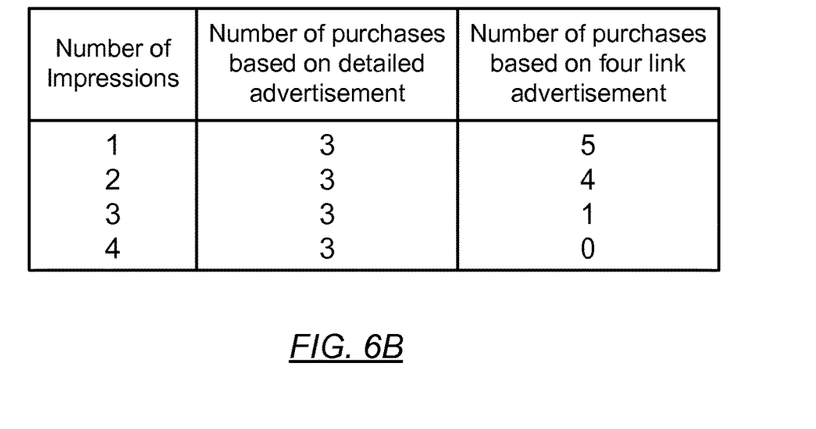

As shown in FIG. 6B, for each type of advertisement, the number of customers who selected the advertisement when they had a given number of impressions is summed. Again, this data may be collected and summed for all types of advertisements and stored within a database as a data structure, such as a table, list, array, or other structure.

Figure 6C:
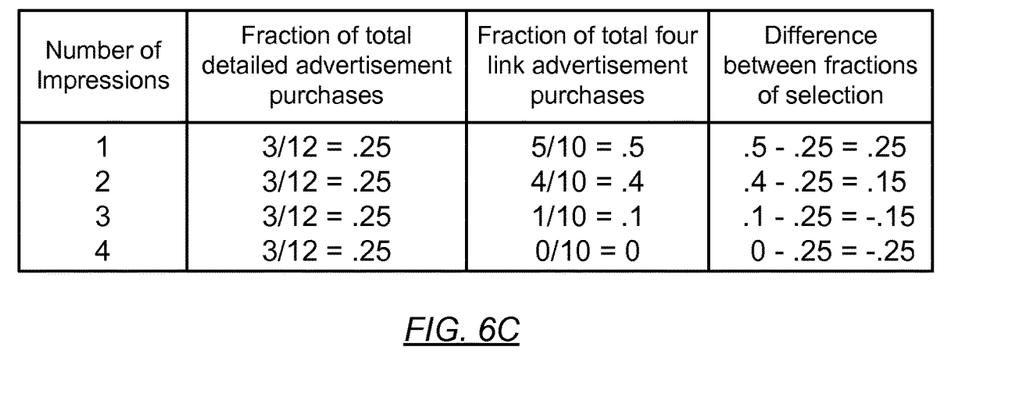

As shown in FIG. 6C, for each type of advertisement, the fraction of total customers who selected the advertisement based on the given number of impressions is calculated for each type of advertisement, and number of impressions of the advertisement. This fraction represents the probability that a customer who buys the product based on the ad type will do so based on the given number of impressions of the advertisement. The difference between the probability of the advertisement being selected is calculated. This number represents the percent advantage the first ad type has of being selected over the second ad type. This data may be collected and calculated for all types of advertisements and stored within a database as a data structure, such as a table, list, array, or other structure.

Figure 6D:
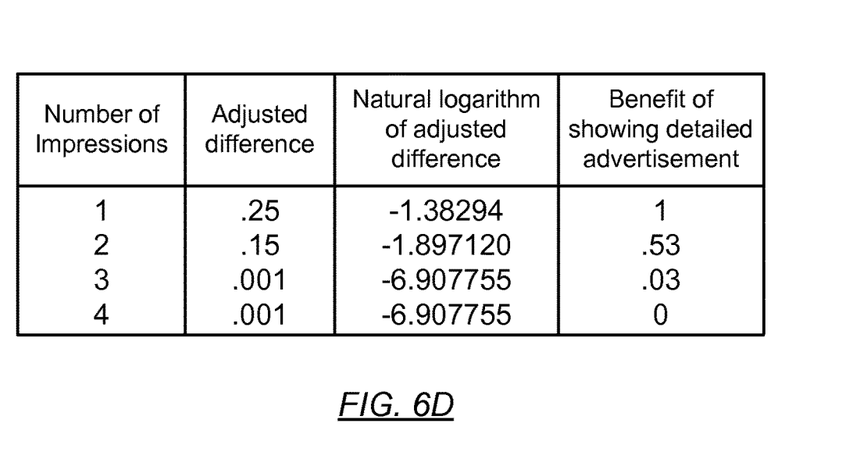

As shown in FIG. 6D, the differences between the advertisement selection probability for the different types of advertisement obtained in the calculations shown in FIG. 6C are modified such that all zero and negative values are replaced with a negligibly small value, in this case 0.001. Since the function used to generate the ad type selection model is exponential, a negligible value ensures that if the natural logarithm is applied to the results, unwanted, unneeded, and undefined results do not taint the dataset that will be used to fit the exponential function and generate the ad type selection model. This data may be collected and modified for all types of advertisements and stored within a database as a data structure, such as a table, list, array, or other structure.

Continuing with FIG. 6D, after the exponential probability function has been fitted to the dataset, it is used to generate the ad type selection model. The ad type selection model may be direct mapping of the output of the exponential function to the whole numbers of the set of impressions likely to be encountered. The exponential function used to generate the ad type selection model may be saved in case the set needs to be regenerated, or unexpected values are encountered.

Figure 7:
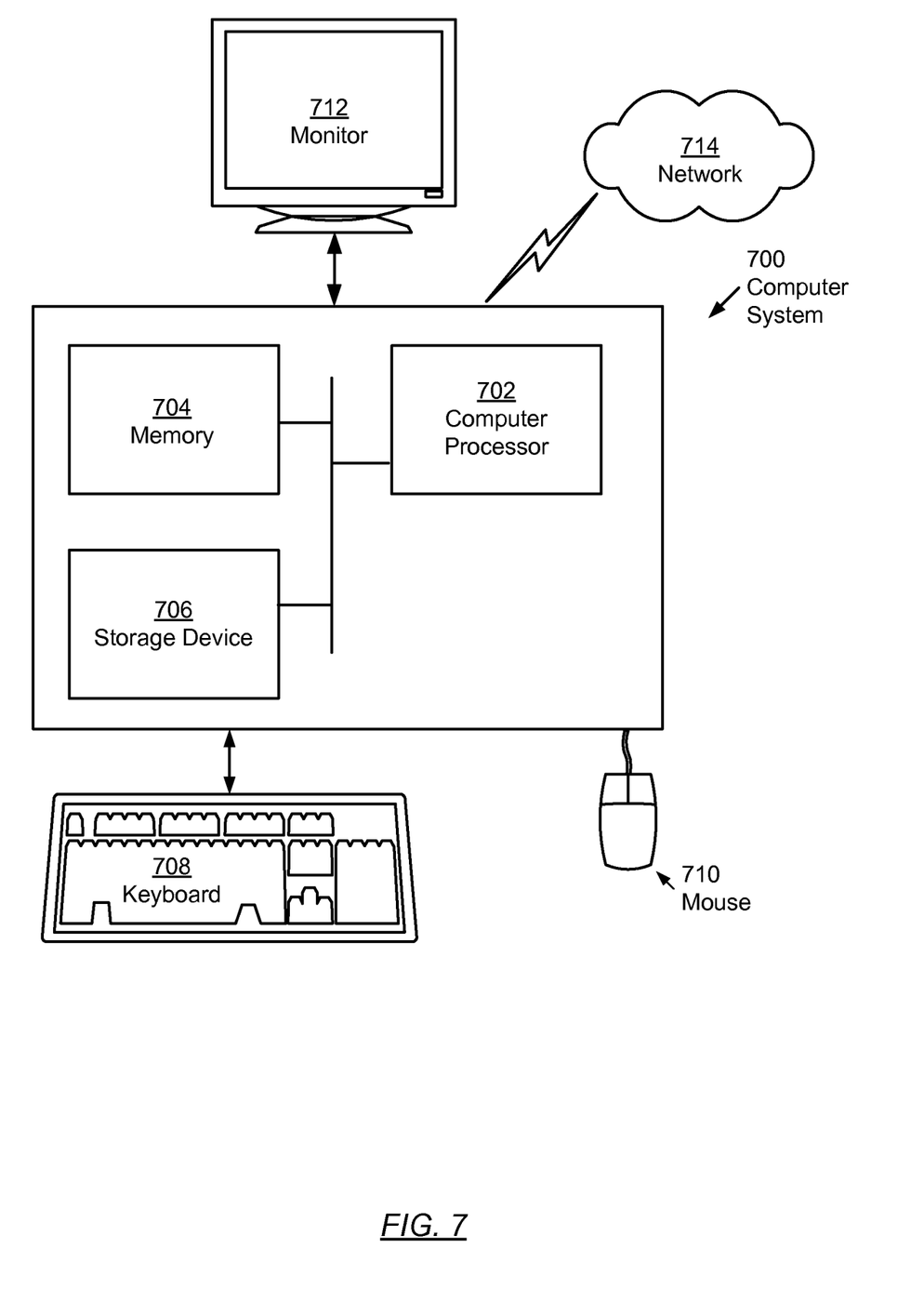
FIG. 7 shows a diagram of a computer system in accordance with one embodiment of the invention.

Embodiments of the invention may be implemented on virtually any type of computer regardless of the platform being used. For example, as shown in FIG. 7, a computer system (700) includes one or more computer processor(s) (702) (e.g., hardware processor, integrated circuit, central processing unit, etc.), associated memory (704), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system (700). Alternatively, the node may correspond to a computer processor (702) with associated physical memory (704). The node may alternatively correspond to a computer processor (702) or micro-core of a computer processor (702) with shared memory and/or resources. Further, software instructions to perform embodiments of the invention may be stored on a computer readable medium such as a compact disc (CD), a diskette, a tape, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for selecting advertisements to embed in an online application, comprising:
   detecting an access to the online application by a customer;
   determining, using an ad type selection model, an advertisement to embed in the online application based on an impression tracker associated with the customer and impression data for a plurality of impressions,
      wherein the impression data includes (i) a first pageview associated with a first Internet Protocol (IP) address and a first duration, and (ii) a second pageview associated with a second Internet Protocol (IP) address and a second duration,
      wherein the first pageview and the second pageview share a same customer ID, and wherein the ad type selection model generates a probability of showing a particular type of advertisement;
displaying, to the customer, the advertisement;
incrementing the impression tracker associated with the customer;
receiving, from the customer via a user device, a selection of the advertisement;
storing a type of the advertisement and a value of the impression tracker as ad selection data, wherein the type of the advertisement is a first ad type;
determining, responsive to the ad selection data, that the ad type selection model is to be updated;
updating the ad type selection model based on the ad selection data to obtain an updated ad type selection model, wherein updating comprises:
  determining a number of impressions, of the first ad type, where a plurality of customers becomes sufficiently fatigued with the first ad type to a point where the first ad type no longer offers a benefit over a second ad type, the plurality of customers including the customer;
  updating the ad type selection model using the number of impressions to produce an updated ad type selection model; and
displaying, based on the updated ad type selection model, the second ad type to the customer to reduce customer fatigue with respect to advertisements embedded in the online application.

2. The method of claim 1, further comprising:
determining, for a given number of impressions, a number of selections of the first ad type and a number of selections of the second ad type, wherein the selections are made by a community of customers of the online application;
calculating a first value, which represents a fraction of the total selections of the first ad type that occurred after the given number of impressions;
calculating a second value, which represents a fraction of the total selections of the second ad type that occurred after the given number of impressions;
subtracting the first value from the second value to obtain a calculated advantage that the first ad type is selected as opposed to the second ad type for the given number of impressions; and
obtaining, using regression analysis, new values for constants used in an exponential probability function of the ad type selection model, wherein the new value for the constant corresponds to the calculated advantage value.

3. The method of claim 2, wherein an output of the exponential probability function is the difference in the probability that displaying the first ad type as opposed to the second ad type results in a selection by the customer.

4. The method of claim 3, wherein the first ad type comprises a single link used to purchase a product and a description of the first product, and wherein the second ad type comprises a plurality of links to a plurality of products comprising the product.

5. The method of claim 4, further comprising:
determining, for the given number of impressions, a number of selections of a first product advertisement, wherein the first product advertisement is of the first ad type and comprises a link to a first product of the plurality products;
determining, for the given number of impressions, a number of selections of a second product advertisement, wherein the second product advertisement is of the first ad type and comprises a link to a second product of the plurality of products;
calculating a first product selection value, which represents the fraction of a total number of selections of the first product advertisement which occurred at the given number of impressions;
calculating a second product selection value, which represents the fraction of a total number of selections of the second product advertisement which occurred at the given number of impressions;
calculating a ratio of the first product selection value and the second product selection value; and
dividing the probability that the first ad type is selected between the first product advertisement and the second product advertisement according to the ratio.

6. The method of claim 3,
wherein the exponential probability function has the form $Y=e^{(a-bX)}$, wherein 'X' is the given number of impressions,
wherein 'e' is the base of the natural logarithm,
wherein the variables 'a' and 'b' are the constants, and
wherein 'Y' is the probability that the first ad type is selected over the second ad type for based on the number of impressions.

7. The method of claim 1, wherein the online application is a financial management application, and wherein the products being advertised are expansion modules which comprise additional functionality for the financial management application.

8. The method of claim 1, wherein the impression data includes a frequency of the plurality of impressions.

9. A system for selecting an advertisement to embed in an online application, comprising:
a computer processor and memory, operatively connected to the computer processor;
an online application comprising the advertisement, and further comprising:
  an advertisement recommendation engine, stored in memory, executing on the computer processor, and configured to:
    detect an access to the online application by a customer;
    determine, using an ad type selection model, the advertisement to embed in the online application based on an impression tracker associated with the customer and impression data for a plurality of impressions,
      wherein the impression data includes (i) a first pageview associated with a first Internet Protocol (IP) address and a first duration, and (ii) a second pageview associated with a second Internet Protocol (IP) address and a second duration,
      wherein the first pageview and the second pageview share a same customer ID, and
      wherein the ad type selection model generates a probability of showing a particular type of advertisement;
    increment the impression tracker associated with the customer;
    receive, from the customer via a user device, a selection of the advertisement;
    store, after the selection, a type of the advertisement and a value of the impression tracker as ad selection data, wherein the type of the advertisement is a first ad type; and a selection model manager stored in memory, executing on the computer processor, and configured to:
  determine, responsive to the ad selection data, that the ad type selection model is to be updated;
  update the ad type selection model based on the ad selection data to obtain an updated ad type selection model, wherein the selection model manager is further configured to update the ad type selection model by being configured to:
    determine a number of impressions, of the first ad type, where a plurality of customers becomes sufficiently fatigued with the first ad type to a point where the first ad type no longer offers a benefit over a second ad type, the plurality of customers including the customer; and
    update the ad type selection model using the number of impressions to produce an updated ad type selection model; and
  display, based on the updated ad type selection model, the second ad type to the customer to reduce customer fatigue with respect to advertisements embedded in the online application; and
a database configured to store the impression data and the ad selection data.

10. The method of claim 1, wherein the ad type selection model is an exponential probability function.

11. The system of claim 9, wherein the selection model manager is further configured to:
  determine, for a given number of impressions, a number of selections of the first ad type and a number of selections of the second ad type made by a community of customers of the web-based application;
  calculate the number of selections of the first ad type for the given number of impressions as a fraction of a total number of selections of the first ad type;
  calculate the number of selections of the second ad type for the given number of impressions as a fraction of a total number of selections of the second ad type;
  subtract the fraction of the second ad type from the fraction of the first ad type to obtain a calculated advantage value of the first ad type over the second ad type for the given number of impressions; and
  obtain, using regression analysis, new values for constants used in an exponential probability function of the ad type selection model, wherein the new value for the constant corresponds to the calculated advantage value.

12. The system of claim 11,
  wherein an output of the exponential probability function is the difference in the probability that displaying the first ad type as opposed to the second ad type results in a selection by the customer,
  wherein the first ad type comprises a single link used to purchase a product and a description of the first product, and
  wherein the second ad type comprises a plurality of links to a plurality of products comprising the product.

13. The system of claim 12, wherein the selection model manager further comprises functionality to:
  determine, for the given number of impressions, a number of selections of a first product advertisement, wherein the first product advertisement is of the first ad type and comprises a link to a first product of the plurality of products;
  determine, for the given number of impressions, a number of selections of a second product advertisement, wherein the second product advertisement is of the first ad type and comprises a link to a second product of the plurality of products;
  calculate a third value, which represents the fraction of a total number of selections of the first product advertisement which occurred at the given number of impressions;
  calculate a fourth value, which represents fraction of a total number of selections of the second product advertisement which occurred at the given number of impressions;
  calculate a ratio of the third value and the fourth value; and
  divide the probability that the first ad type is selected between the first product advertisement and the second product advertisement according to the ratio.

14. The system of claim 9, wherein the online application is a financial management application, and wherein the products being advertised are expansion modules which comprise additional functionality for the financial management application.

15. The system of claim 9, wherein the ad type selection model is an exponential probability function.

16. A non-transitory computer readable medium storing computer executable instructions to:
  detect an access to the online application by a customer;
  determine, using an ad type selection model, an advertisement to embed in the online application based on an impression tracker associated with the customer and impression data for a plurality of impressions,
    wherein the impression data includes (i) a first pageview associated with a first Internet Protocol (IP) address and a first duration, and (ii) a second pageview associated with a second Internet Protocol (IP) address and a second duration,
    wherein the first pageview and the second pageview share a same customer ID, and
    wherein the ad type selection model generates a probability of showing a particular type of advertisement;
  display, to the customer, the advertisement;
  increment the impression tracker associated with the customer;
  receive, from the customer via a user device, a selection of the advertisement;
  store a type of the advertisement and a value of the impression tracker as ad selection data, wherein the type of the advertisement is a first ad type;
  determine, responsive to the ad selection data, that the ad type selection model is to be updated;
  update the ad type selection model based on the ad selection data to obtain an updated ad type selection model, by comprising instructions to:
    determine a number of impressions, of the first ad type, where a plurality of customers becomes sufficiently fatigued with the first ad type to a point where the first ad type no longer offers a benefit over a second ad type, the plurality of customers including the customer;
    update the ad type selection model using the number of impressions to produce an updated ad type selection model; and
  display, based on the updated ad type selection model, the second ad type to the customer to reduce customer fatigue with respect to advertisements embedded in the online application.

17. The non-transitory computer readable medium of claim 16, further storing computer executable instructions to:
- determine, for a given number of impressions, a number of selections of the first ad type and a number of selections of the second ad type, wherein the selections are made by a community of customers of the online application;
- calculate a first value, which represents a fraction of the total selections of the first ad type that occurred after the given number of impressions;
- calculate a second value, which represents a fraction of the total selections of the second ad type that occurred after the given number of impressions;
- subtract the first value from the second value to obtain the difference in a probability that the first ad type is selected as opposed to the second ad type for the given number of impressions; and
- obtain, using regression analysis, new values for constants used in an exponential probability function of the ad type selection model, wherein the new value for the constant corresponds to the calculated advantage value.

18. The non-transitory computer readable medium of claim 17,
- wherein an output of the exponential probability function is the difference in the probability that displaying the first ad type as opposed to the second ad type results in a selection by the customer,
- wherein the first ad type comprises a single link used to purchase a product and a description of the first product, and
- wherein the second ad type comprises a plurality of links to a plurality of products comprising the product.

19. The non-transitory computer readable medium of claim 18, further storing computer executable instructions to:
- determine, for the given number of impressions, a number of selections of a first product advertisement, wherein the first product advertisement is of the first ad type and comprises a link to a first product of the plurality of products;
- determine, for the given number of impressions, a number of selections of a second product advertisement, wherein the second product advertisement is of the first ad type and comprises a link to a second product of the plurality of products;
- calculate a third value, which represents the fraction of a total number of selections of the first product advertisement which occurred after the given number of impressions;
- calculate a fourth value, which represents the fraction of a total number of selections of the second product advertisement which occurred after the given number of impressions;
- calculate a ratio of the third value and the fourth value; and
- divide the probability that the first ad type is selected between the first product advertisement and the second product advertisement according to the ratio.

20. The non-transitory computer readable medium of claim 18, wherein the ad type selection model is an exponential probability function.

* * * * *

UNITED STATES PATENT AND TRADEMARK OFFICE
CERTIFICATE OF CORRECTION

PATENT NO. : 10,546,319 B1  
APPLICATION NO. : 13/907757  
DATED : January 28, 2020  
INVENTOR(S) : Houtao Deng et al.

Page 1 of 1

It is certified that error appears in the above-identified patent and that said Letters Patent is hereby corrected as shown below:

In the Claims

Claim 5, Column 15, Line 64, the word "of" should be added between the words "plurality" and "products".

Signed and Sealed this  
Ninth Day of June, 2020

Andrei Iancu  
*Director of the United States Patent and Trademark Office*